United States Patent [19]

Ide et al.

[11] Patent Number: 4,564,073
[45] Date of Patent: Jan. 14, 1986

[54] PLOW OR HARROW

[75] Inventors: Katsuyuki Ide; Masatoshi Yamada, both of Chitose; Katsusuke Sasaki, Eniwa, all of Japan

[73] Assignee: Star Farm Machinery Mfg. Co., Ltd., Hokkaido, Japan

[21] Appl. No.: 631,159

[22] Filed: Jul. 16, 1984

[30] Foreign Application Priority Data

Jan. 17, 1984 [JP] Japan .............................. 59-4981[U]

[51] Int. Cl.⁴ .......................................... A01B 63/24
[52] U.S. Cl. .................................... 172/120; 172/124; 172/446; 280/462; 280/470
[58] Field of Search ................. 172/98, 120, 124, 446, 172/440, 441, 667, 476; 280/462, 463, 464, 465, 466, 467, 468, 470

[56] References Cited

U.S. PATENT DOCUMENTS

| 1,422,186 | 7/1922 | Davis | 280/464 X |
| 2,601,818 | 7/1952 | Zwemke | 172/124 X |
| 3,454,285 | 7/1969 | Van Peursem | 280/468 |
| 4,158,390 | 6/1979 | Maschio | 280/468 |

FOREIGN PATENT DOCUMENTS

| 1058294 | 11/1956 | Fed. Rep. of Germany | 172/446 |
| 1257784 | 2/1961 | France | 172/324 |
| 934865 | 8/1963 | United Kingdom | 172/124 |
| 970536 | 9/1964 | United Kingdom | 172/124 |
| 2033719 | 10/1978 | United Kingdom | 172/446 |

Primary Examiner—Richard J. Johnson
Attorney, Agent, or Firm—Scrivener, Clarke, Scrivener and Johnson

[57] ABSTRACT

An improvement of a plow or a harrow of the type in which a plurality of saucer-like disks carried by a rotary shaft inclined at an angle with respect to the direction of travel of a tractor are forced to rotate, thereby plowing uncultivated farm land. The plurality of disks or disk gang is supported by a parallel linkage system and the angle of the disk gang with respect to the direction of travel of the tractor can be freely selected so that, in accordance with the skill of an operator and soil condition which will be encountered, either the horizontal travel or the inclined travel may be selected.

4 Claims, 4 Drawing Figures

PLOW OR HARROW

BACKGROUND OF THE INVENTION

The present invention relates to an improvement of a plow or harrow of the type in which a plurality of saucer-shaped disks attached at an angle with respect to the direction of travel of a tractor to one axle or gang bolt such that these disks are forcibly rotated to plow an uncultivated field.

In general, the plowing by a plowing machine may be divided into the so-called "horizontal travel" in which, as shown in FIG. 1, both the right and left wheels of a tractor travel on an uncultivated land and the so-called "inclined travel" in which, as shown in FIG. 2, only the right wheels of the tractor are dropped into a furrow so that the furrow wall acts as a guide for the wheels in the furrow. In the case of the horizontal travel, an operator will not be tired because of the tractor being maintained horizontal; however, during forward travel especially on inclined and rough farm lands, the operator must expend great care in maintaining the tractor in a desired direction so as to avoid plowing again the plowed field. In the case of the inclined travel, the direction of travel of the tractor can be easily controlled since the right wheels are guided by the furrow wall. However, the operator will be tired because of the tractor being inclined to the right. Thus, the horizontal travel and the inclined travel have their own merits and demerits so that an operator chooses the horizontal travel or the inclined travel depinding upon his or her skill and upon the conditions of a farm land to be cultivated.

In view of the above, the present invention has for its object to provide a plow or harrow which can easily plow and in which the angle of disks can be easily adjusted.

DETAILED DESCRIPTION OF THE PREFERRED EMBODIMENTS

Figure 3:
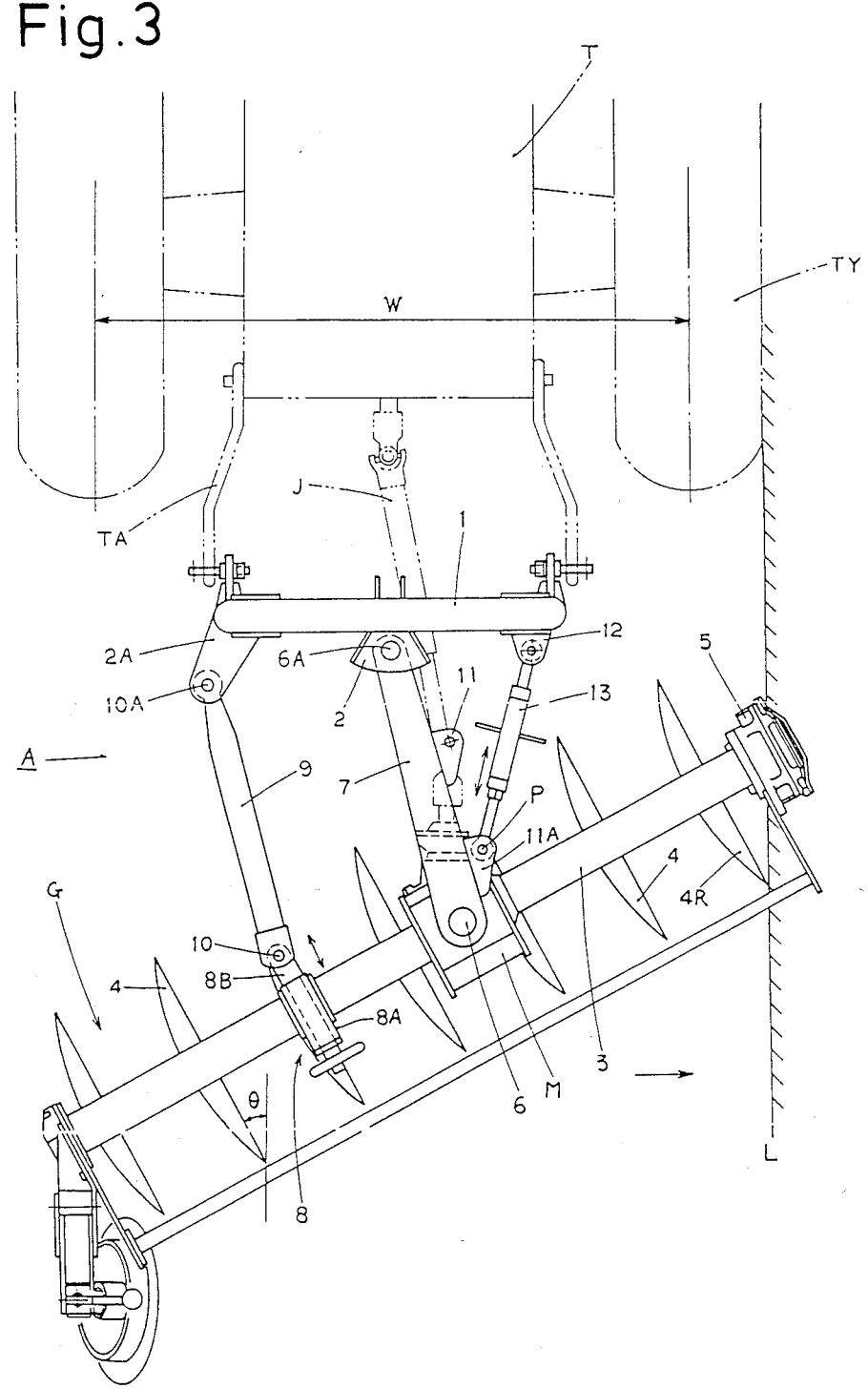
FIG. 3 shows a top view of a plow or harrow according to the present invention in the case of the horizontal travel.
Figure 4:
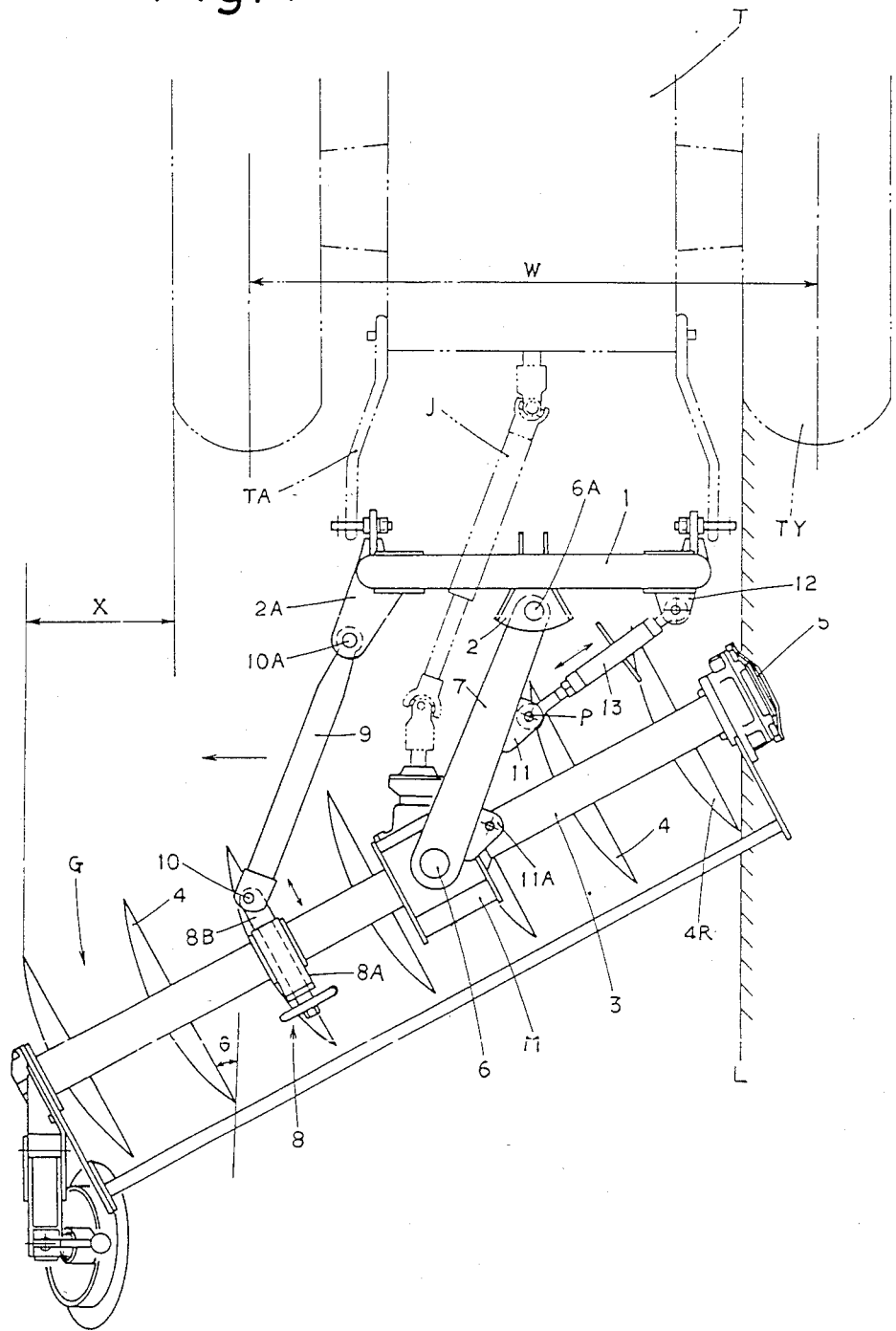
FIG. 4 is a top view of the plow or harrow according to the present invention in the case of the inclined travel.

In FIGS. 3 and 4, A designates a plow or harrow in accordance with the present invention.

A three-point frame 1 is attached through three-point links TA to a tractor T and left, center and right brackets 2A, 2 and 12 are extended from the three-point frame 1. Reference numeral 3 designates a cultivator frame which is supported at an inclined angle with respect to the direction of travel of the tractor T by means of central and left links 7 and 9 which constitute a parallel linkage together with the brackets 2 and 2A. More particularly, one end of the links 7 and 9 are pivoted with pivot pins 6A and 10A to the brackets 2 and 2A, respectively. The other end of the link 7 is connected with a pivot pin 6 to a transmission M substantially at the midpoint between the ends of the cultivation frame 3. The other end of the link 9 is pivoted with a pivot pin 10 to a disk angle adjustment device 8. The device 8 comprises a screw rod 8B threadably engaged with a nut 8A securely fixed to the cultivator frame 3 so that the screw rod 8B is displaced in the directions indicated by the double-pointed arrow. Therefore the other end of the link 9 is pivoted with the pivot pin 10 to the free end of the screw rod 8B. Reference numeral 13 designates a turnbuckle interconnected between the bracket 12 and a bracket 11A which is extended from the right side rear end of the link 7. The turnbuckle 13 is connected to the bracket 11A with a pin P which may be detached. Reference numeral 11 designates a bracket extended from the center portion of the link 7 toward the right. The bracket 11 is formed with a pin hole for receiving the pin P. Instead of the turnbuckle, an expansion-contraction means such as a hydraulic cylinder may be used. Reference numeral 4 designates a saucer-like disk and a plurality of such disks 4 are attached to a rotary shaft (not shown) disposed below the cultivator frame 3 so that a disk gang G is provided. Since the cultivator frame 3 is inclined at an angle with respect to the direction of travel, these disks maintain a predetermined disk angle $\theta$ as shown. Reference numeral 5 designates a chain transmission means for forced rotation of the rotary shaft.

Figure 1:
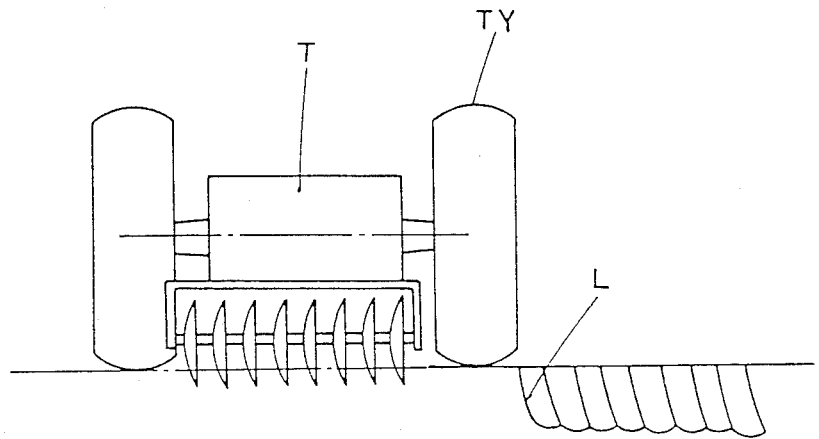
FIG. 1 is a rear view used for explanation of the horizontal travel.

Next the mode of operation will be described. FIGS. 1 and 3 show the horizontal travel of the plow or harrow. The pin P which has been inserted into the pin hole of the bracket 11 is pulled out so that the turnbuckle 13 and the link 7 are disconnected from each other. Thereafter, the cultivator frame 3 is manually swung about the pivot pins 6A and 10A so that the disk gang G is displaced in parallel to the right without causing the change of the angle of inclination of the cultivator frame 3 with respect to the direction of travel (or without changing the disk angle $\theta$). Thereafter, the rear end of the turnbuckle 13 is connected with the pin P to the bracket 11A so that the frame position is maintained firmly. Next the turnbuckle 13 is extended or retracted such that the rightmost disk 4R is aligned with the outermost tread line L of the tire TY of the tractor T. When the screw rod 8B is extended or retracted as indicated by the double-pointed arrow, the cultivator frame 3 is caused to swing about the pivot pin 6, whereby the disk angle $\theta$ can be varied. In this embodiment, the disk angle is in general 28°, but it can be varied suitably depending upon soil condition which will be encountered. (The greater the disk angle $\theta$, the stronger the cut and turning action becomes.) After the working position of the rightmost disk 4R and the disk angle $\theta$ of disks 4 have been adjusted, the tractor T is started. The power of the tractor T is transmitted to the rotary shaft (not shown) carrying the disks 4 through a power take-out shaft, a universal transmission shaft J, the transmission M, a transmission shaft (not shown) disposed within the cultivator frame 3 and the chain transmission means 5 so that the disks 4 are forced to rotate in the case of the horizontal travel.

Figure 2:
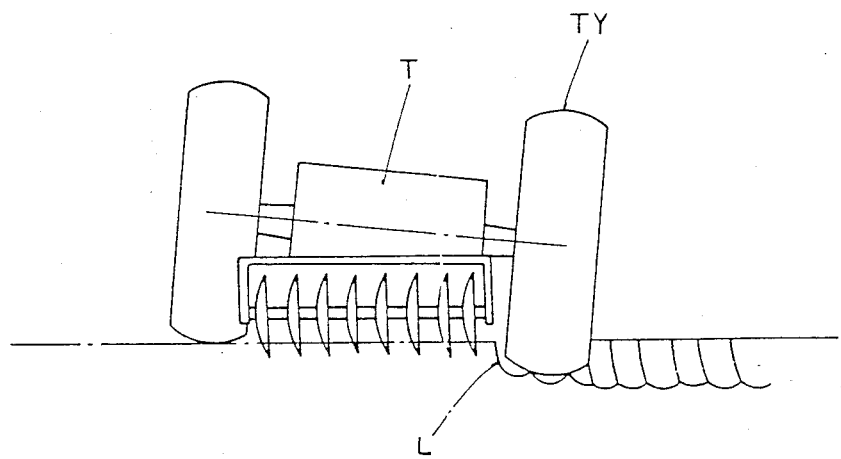
FIG. 2 is a rear view used for explanation of the inclined travel.

FIGS. 2 and 4 show the inclined travel. The pin P which has been inserted into the pin hole of the bracket 11A is pulled out so that the turnbuckle 13 and the center link 7 are disconnected from each other. Next the cultivator frame 3 is manually swung toward the left about the pivot pins 6A and 10A so that the disk gang G is displaced in parallel without changing the disk angle $\theta$. Thereafter the rear end of the turnbuckle 13 is connected with the pin P to the bracket 11 so that the frame is securely maintained in position. Next the turnbuckle 13 is extended or retracted so that the rightmost disk 4R is aligned with the innermost tread line L of the tire TY of the tractor T. When the screw rod 8B is extended or retracted, the cultivator frame 3 is caused to swing about the pivot pin 6 so that the disk angle $\theta$ can be varied. After the disk gang G is displaced to the left and after the working position of the rightmost disk 4R and the disk angle $\theta$ of the disks 4 are adjusted, the disks are forced to rotate in a manner substantially similar to that described above so that the plowing by the inclined travel can be carried out.

The novel effects, features and advantages of the present invention may be summarized as follows:

(I) According to the present invention, a parallel linkage is used so that the disk gang G can be displaced to the right or left and securely held in position without changing the disk angle $\theta$. As a result, in accordance with the skill of an operator and the configuration of a farm field, the horizontal travel or the inclined travel may be suitably selected in a very simple manner.

(II) The fine adjustment of the displacement to the right or left of the disk gang can be effected by means of the turnbuckle so that regardless of the horizontal travel or the inclined travel, the rightmost disk can be easily aligned with the tread line of the right rear wheel of the tractor. Especially, even when the rear wheel tread W varies depending upon tractors used, the rightmost disk can be easily aligned to the tread line of the right rear wheel of the tractor depending upon the width W.

(III) The adjustment of the disk angle $\theta$ can be easily carried out by extending or retracting the screw means or the like.

(IV) Especially when the disk gang G is displaced to the left, the leftmost disk is spaced apart from the left rear wheel of the tractor by the width X (See FIG. 4) so that the plowing is much facilitated.

What is claimed is:

1. A plow or a harrow comprising a cultivator frame connected at an angle with respect to a direction of travel of a tractor through a parallel linkage mechanism including a center link and a left link to said tractor, a plurality of saucer-like disks set at an inclined angle with respect to the direction of travel of said tractor and carried by a rotary shaft disposed below said cultivator frame, said center link having a first bracket extended from a rear end thereof and a second bracket extended from a point forwardly spaced apart from said rear end, and a connecting member having one end pivotably connected to said tractor and the other end connected selectively to said first or second brackets, the rear end of said left link being connected to a disk angle adjustment device comprising a screw rod which can be extended and retracted in the direction of travel of said tractor.

2. A plow or harrow according to claim 1 wherein said rotary shaft is forced to rotate.

3. A plow or harrow according to claim 1 wherein said connecting member comprises an extendable-and-retractable means.

4. A plow or harrow according to claim 3 wherein said extendable-and-retractable means is a turnbuckle.

* * * * *